Feb. 27, 1934.  G. C. BOUCHARD  1,948,612
INCLINOMETER FOR AIRPLANES
Filed March 28, 1929

INVENTOR
Guy C. Bouchard
BY
ATTORNEYS

Patented Feb. 27, 1934

1,948,612

UNITED STATES PATENT OFFICE 1,948,612

INCLINOMETER FOR AIRPLANES

Guy C. Bouchard, Kalamazoo, Mich.

Application March 28, 1929. Serial No. 350,661

6 Claims. (Cl. 33—206)

The objects of this invention are:

First, to provide a simple and efficient level instrument for use in an inclinometer.

Second, to provide improved means of rendering the same conspicuous and effective.

Objects pertaining to details and economies of structure and operation will appear from the description to follow. A preferred embodiment of my invention is illustrated in the accompanying drawing, in which.

Figure 3:
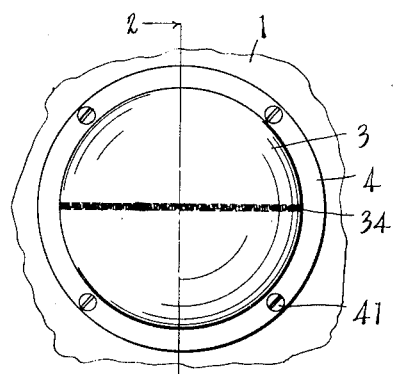
Fig. 3 is an enlarged detail sectional view on line 3—3 of Fig. 2, showing the face of the supporting case with the inwardly projecting space and attaching lugs, the attaching screws being shown in section.
Figure 2:
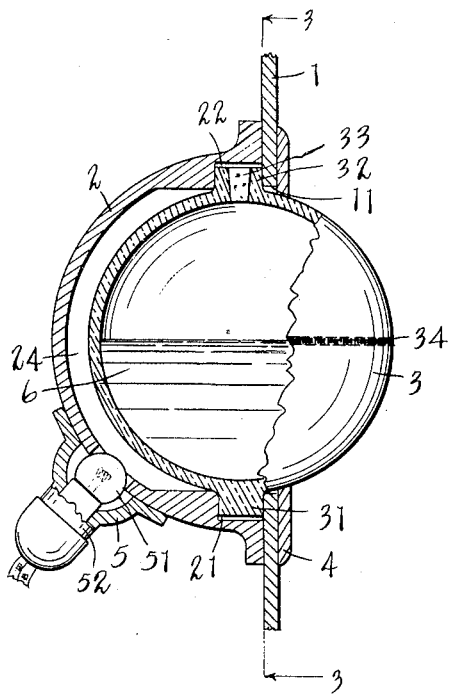
Fig. 2 is an enlarged detail vertical sectional view on line 2—2 of Fig. 1, a part of the globe and lamp being shown in full lines.
Figure 1:
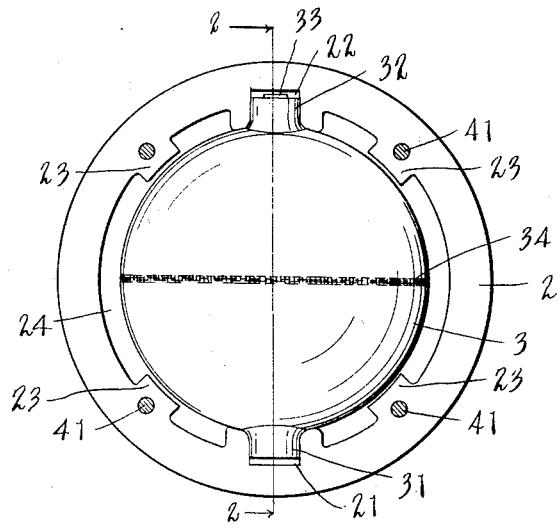
Fig. 1 is a front view of my improved inclinometer on the instrument board of an airplane.

The parts will be identified by their numerals of reference which are the same in all the views.

1 is the instrument board or dashboard of an airplane. It is perforated at 11 with a round aperture. 2 is the casing for my improved level instrument, hemispherical in form and provided with sockets 21 and 22 for supporting the transparent level globe. 3 is the transparent glass globe provided with a supporting lug 31 at the bottom which fits into the socket 21 and with a similar lug 32 at the top fitting into the top socket 22 of the case. The lug 32 is practically like a bottle neck, being opened and corked with a cork 33.

The hemispherical case 2 is of such a diameter as to afford a space 24 around the sphere 3 which protects the same from harm and also affords an illumination area. The front of the globe is fully exposed to view.

A narrow black band 34 is around the globe 3, being carefully adjusted to the particular airplane to show when it is on the level and going straight forward. This may be at exactly right angles to the plane of the instrument board 1 or it may be at a different angle depending upon the particular central level line of the plane on which the instrument is placed. The band is very narrow being formed as an etching in the glass filled with black enamel. It is a strong black line.

4 is the attaching ring serving as a face plate and guard around the front of the globe and is secured in place by screws 41 extending into the casing 2 opposite the lugs 23 and supporting the structure very effectively in place. 5 is a shell for an electric lamp 51, which may be colored, which is carried in socket 52 therein and delivers its light through aperture 25 in the case 2. 6 is a transparent liquid in the level globe filling the same to the level 34. Because of the illumination, it is very conspicuous. It may be tinted or colored. It is a mixture of a light oil, 75%, with alcohol, 5%, and turpentine, 20%, which keeps the glass clean and insures a definite level mark for the top of the liquid. Mercury may be used but of course is not transparent. Thin lubricating oil is usable but somewhat soils the glass. The lubrication oil insures prompt action and a clear glass. Glycerine mixtures are too slow.

In use it will be very clear that when the airplane is level and moving straight forward the liquid within the globe will coincide with the level line 34. Any discrepancy in an up or down movement or in an inclination to one side or the other is very conspicuous and the extent of it very definitely appears from this instrument. Of course in the daytime the light may be dispensed with but it is of great advantage even then. At night it, of course, makes the instrument absolutely conspicuous and effective. The conspicuous level of the liquid is visible at all times and except when the plane is banking shows the horizon precisely. The relation of the black line shows the relation of the ship to the horizon.

My improved inclinometer can be greatly varied in its details without departing from my invention. I desire to claim the same specifically and also broadly as pointed out in the claims.

Having thus described my invention, what I claim as new and desire to secure by Letters Patent, is:

1. The combination with the instrument board of an airplane, of a transparent hollow globe with a definite level line therearound, and having a supporting lug at the bottom and an apertured supporting lug at the top for the introducing of liquid, a supporting hemispherical casing for the globe of a diameter to afford an open space around the globe the same having inwardly projecting attaching lugs and an illuminating aperture in the lower part of the side wall thereof and with top and bottom sockets for the supporting lugs of said globe, a liquid in said globe filling it to the level line, an electric lamp with suitable casing for attaching to the said main casing within the illuminating aperture, and a clamp ring and attaching screws for securing the ring and hemispherical casing to the said instrument board.

2. The combination with the instrument board of an airplane, of a transparent hollow globe with a definite level line therearound and having a supporting lug at the bottom and an apertured supporting lug at the top for the introducing of liquid, a supporting hemispherical casing for the globe of a diameter to afford an open space around the globe the same having inwardly projecting attaching lugs with top and bottom sockets for the supporting lugs of said globe, a liquid in said globe filling it to the level line, and a clamp ring and attaching screws for securing the ring and hemispherical casing to the said instrument board.

3. The combination with the instrument board of an airplane, of a transparent hollow globe with a definite level line therearound, a supporting hemispherical casing therefor of a diameter to afford an open space around the globe the same having inwardly projecting attaching lugs and an illuminating aperture in the lower part of the side wall thereof, a liquid in said globe filling it to the level line, an electric lamp with suitable casing for attaching to the said main casing within the illuminating aperture, and a clamp ring and attaching screws for securing the ring and hemispherical casing to the said instrument board.

4. The combination with the instrument board of an airplane, of a transparent globe with a definite level line therearound, a supporting hemispherical casing therefor of a diameter to afford an open space around the globe with inwardly projecting attaching lugs and affording unobstructed view of the front of said globe, and a clamp ring with attaching screws for securing the hemispherical casing to the said instrument board.

5. The combination of a transparent globe with level line therearound, means for supporting the same, and a liquid within the same comprising light oil and alcohol, and turpentine, thereby securing prompt action and a clean glass.

6. The combination with the instrument board of an airplane, of a transparent globe with a definite level line therearound, a supporting hemispherical casing therefor of a diameter to afford an open space around the globe with inwardly projecting attaching lugs and affording unobstructed view of the front of said globe, a clamp ring with attaching screws for securing the hemispherical casing to the said instrument board, and a lamp disposed in the case below the level of said liquid.

GUY C. BOUCHARD.